June 25, 1935. M. MAAG 2,005,867
CONTROL SYSTEM AND TO THE CONTROL OF FLUID OPERATED MECHANISM
Filed Jan. 24, 1934     3 Sheets-Sheet 1
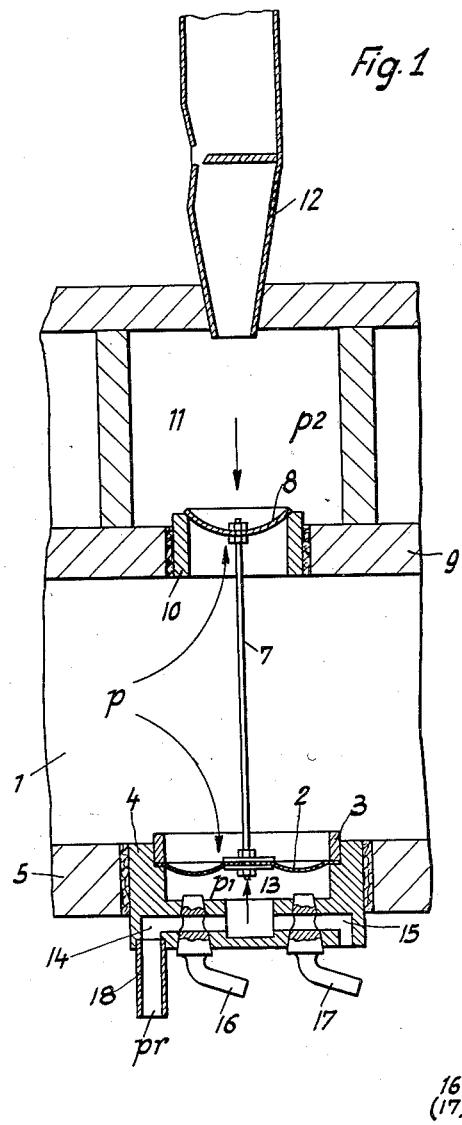

June 25, 1935.  M. MAAG  2,005,867
CONTROL SYSTEM AND TO THE CONTROL OF FLUID OPERATED MECHANISM
Filed Jan. 24, 1934   3 Sheets-Sheet 3
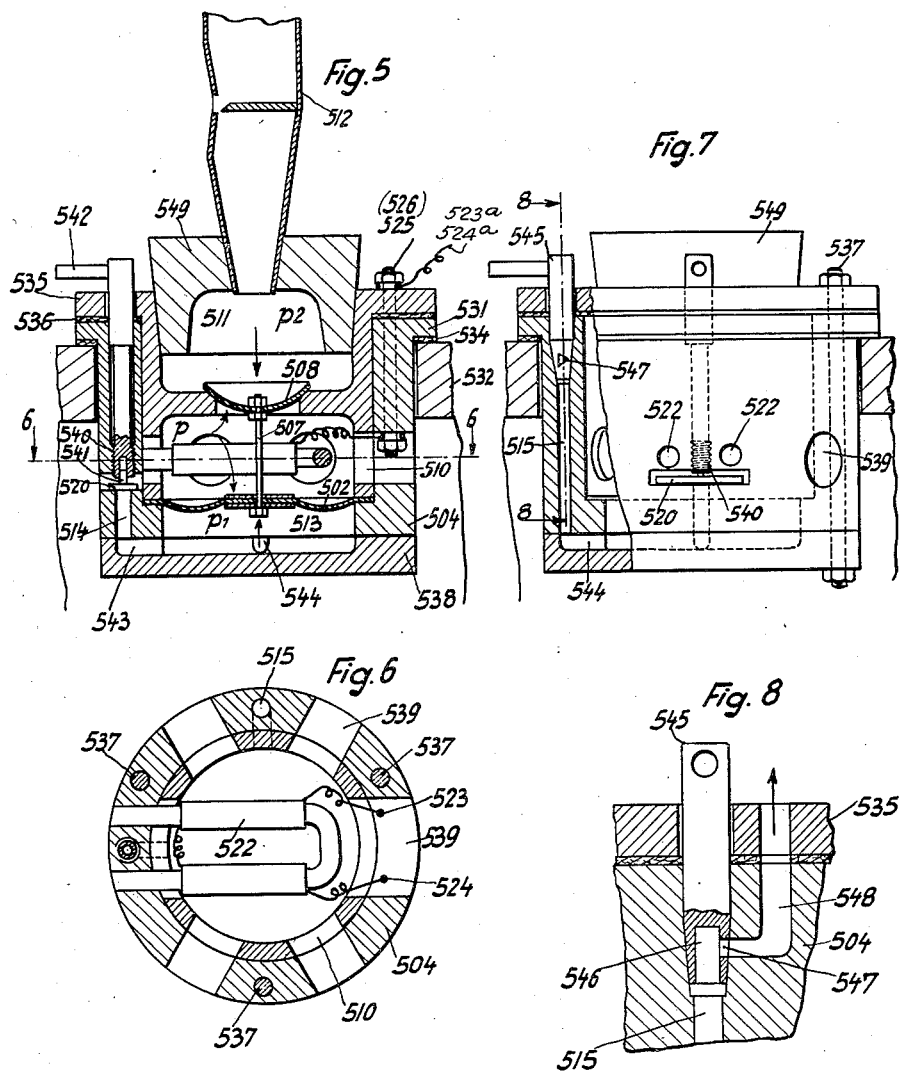
Inventor
Max Maag
by Joseph K. Schofield
Attorney Patented June 25, 1935

2,005,867

UNITED STATES PATENT OFFICE 2,005,867

CONTROL SYSTEM AND TO THE CONTROL OF FLUID OPERATED MECHANISM

Max Maag, Schwamendingen, near Zurich, Switzerland

Application January 24, 1934, Serial No. 708,136
In Germany January 23, 1933

8 Claims. (Cl. 84—336)

This invention relates to a control system and to the control of fluid-operated mechanism, more particularly to the pneumatic control of organs or other wind-operated musical instruments. The object of my invention is the provision of improved means for regulating pneumatic pressure and/or the rate of the increase and decrease of pneumatic pressure in pneumatically operated mechanism, particularly in organs.

I shall describe my invention hereinafter with reference to its application to the wind control of an organ; but I wish it to be understood that my invention is broadly applicable to any fluid-pressure control. Other objects of my invention will appear from the description following hereinafter and the features of novelty will be pointed out in the claims.

A preferred embodiment of my invention is illustrated in the drawings in which

Fig. 1 is an axial section of a simple form of my improved valve mounted in a division stop chest ("Registerkanzellenlade");

Fig. 2 shows a detail of this valve structure;

Fig. 5 is an axial section of a modified valve-unit mounted in a box chest;

Fig. 6 is the section taken along line 6—6 of Fig. 5;

Fig. 7 is an elevation of the valve-unit viewed from the left of Fig. 5;

Fig. 8 is the section taken along line 8—8 of Fig. 7 on an enlarged scale;

I shall first proceed to explain the theory underlying my invention by reference to its application to a musical instrument having wind-operated tone-producers controlled by floating valves of the type disclosed, for instance in my U. S. Patent No. 1,681,547.

The tone-producers are supplied with the operating wind from an operating or blowing chamber which is connected with the wind way of a wind chest through a port controlled by a valve member opening towards the operating chamber, the arrangement being such that the wind pressure prevailing in the wind chest produces the operating wind.

Figure 9:
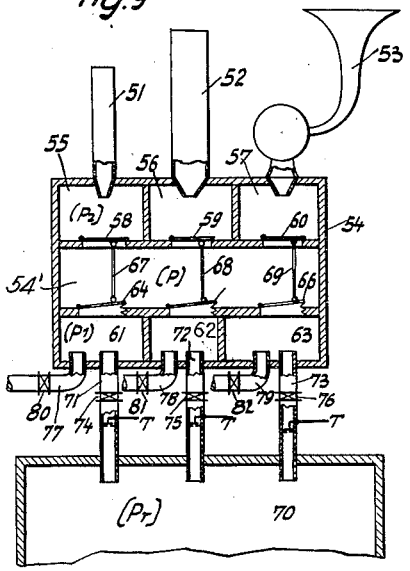
Fig. 9 is a sectional diagrammatic illustration of an instrument provided with a plurality of tone-producers and equipped with my improved controlling system.

With reference to Fig. 9, three tone-producers 51, 52, 53 are mounted on a common wind chest 54 and communicate individually and separately with three wind chambers 55, 56, 57 which are connected with a common wind way 54' through ports each of which is controlled by a floating valve 58, 59 and 60. On the other side of the wind way opposite to the wind chambers, there are provided control chambers 61, 62 and 63 which are sealed from the wind way by resilient diaphragms or bellows 64, 65, 66. Each bellows is connected with the coordinated valve flap for common movement by a rod 67, 68 or 69 respectively. The control chambers are supplied with compressed air or wind from a common relay wind chamber 70 through conduits 71, 72 and 73 which are individually and separately controlled by key-actuated valves diagrammatically indicated at T. If desired, the control chambers 61, 62, 63 may be supplied with wind from the wind way and, in this event, the conduits 71, 72, 73 terminate in said wind way. The valve 58 or 59 or 60 respectively which is arranged to open into the operating chamber of the tone-producer is of the floating type, that is to say, it will float, when operated, in an intermediate position in which the opposed pressures of the operating wind acting on the valve flap and of the relay wind acting on the diaphragm connected to the flap balance each other.

It is an object of my invention to provide a controlling system permitting such valves to be used in organs or other musical wind-operated instruments in which the different tone-producers require a different operating pressure. As this operating pressure depends on the pressure prevailing in the controlling chamber, as will be explained hereinafter, it is a requirement that, when a key is actuated, a predetermined pressure should be produced and maintained in the controlling chamber. I attain this object by individually coordinating separate controlling chambers to the different floating valves, each of said chambers being provided with an inlet and an outlet port.

The pneumatic pressure built up in the controlling chamber upon key actuation depends on the dimensions of said ports and, hence, the ports may be so dimensioned that the operating pressure for each tone-producer will have the desired value. In order to facilitate the job of intonating the tone producers and in order to provide for a possibility of exchanging the tone-producers and of conveniently tuning the same, I prefer the provision of adjusting means whereby the two independent inlet and outlet ports of the control chamber may be varied and their cross-section may be chosen in dependence on the wind pressure required for operating the coordinated tone-producer in each particular case.

As the response of the various tone-producers depends not only on the operating wind pressure, but also on the speed of increase and decrease of this pressure, I prefer to dimension the inlet and outlet ports of the control chamber in such a manner that the pressure increase upon a key depression and the pressure decrease upon a key release will have the rate required for a proper response of the coordinated tone-producer and for a proper decay of the tone. With a given cross-section of the inlet and outlet ports, the same object, that is to say, the control of the rate at which the operating pressure increases and decreases, may also be attained by suitably dimensioning the volume of the control wind chamber.

With reference to Fig. 9 it will be noted that the inlet conduits 71, 72 and 73 of the control chambers 61, 62 and 63 which are separately coordinated to the tone-producers 51, 52 and 53 are each provided with adjusting means in the form of a regulating cock 74, 75 or 76. Similarly, each control chamber is provided with a separate outlet conduit 77, or 78, or 79 respectively, and this outlet conduit is regulatable by an adjustable cock 80, or 81, or 82 respectively.

Hereinafter, I shall analyze the pressure conditions controlling the operation of the first tone-producer, it being understood that the same conditions apply equally to the other tone-producers and control valves.

The supply wind pressure prevailing in the wind chest may be designated by $p$, the pressure in the relay wind chamber $p_r$ (as above stated, these two pressures may have the same degree), the pressure in the control chamber $p_1$, and the pressure in the operating chamber $p_2$.

Normally, when the key is not actuated, the supply wind pressure $p$ acts on the valve flap 58 as well as on the diaphragm 64. The diaphragm is a little larger than the valve flap and, therefore, the valve is kept closed. When a key is depressed, wind of the pressure $p_r$ is supplied to the control chamber 61, and this pressure acts on the diaphragm from below and partly relieves the same from the closing pressure $p$, whereby the pressure $p$ acting on the lower face of the valve flap 58 will become larger than the difference of the pressures $p$ and $p_r$ acting on the diaphragm 64 from opposite sides. Consequently, the valve flap 58 will be slightly lifted and will permit compressed air from channel 54' to enter the operating chamber 55, thus raising the pressure in the operating chamber to $p_2$, this being the operating pressure blowing the tone-producer 51. The pressure $p_2$, however, acts also on the valve flap 58 from above and causes the valve flap to float in a position in which it is kept in equilibrium by the different forces tending to open and close it.

I shall hereinafter designate the free cross-section of the air admission port 74 with $E$; the free cross-section of the air discharge port 80 with $A$; the atmospheric pressure with $b$; the super-pressure of the relay wind in chamber 70 over the atmospheric pressure with $p_r$ and the super-pressure in the control chamber over the atmospheric pressure with $p_1$. The computing problem is to express $p_1$ as a function of the other data.

Keeping in mind that the amount of air entering chamber 61 through cock 71 is substantially equal to the amount discharged through cock 74, it will be apparent that $$E\sqrt{(b+p_r-b+p_1)}=A\sqrt{(b+p_1-b)},$$

wherefrom follows $$E^2(p_r-p_1)=A^2 \cdot p_1$$

or $$p_1 \cdot (A^2+E^2)=p_r \cdot E^2$$

or $$p_1=p_r \cdot \frac{E^2}{E^2+A^2} \qquad p_1=p_r \cdot \frac{1}{1+\left(\frac{A}{E}\right)^2}$$

that is to say, the pressure $p_1$ in chamber 61 depends entirely on the ratio of the cross-sections $$\frac{A}{E}$$

provided that the wind pressure $p_r$ is given.

It follows, that the degree of the controlling pressure may be chosen, as desired, in accordance with the requisite operating conditions of each individual tone-producer by arbitrarily terminating the ratio $$\frac{A}{E}$$

that is to say, by suitably dimensioning the relative cross-sections of the inlet and outlet ports of the respective control chamber. The operating pressure $p_2$ equals substantially the controlling pressure $p_1$ as will be understood from the following consideration: As soon as compressed air is admitted below the diaphragm 64, the above explained equilibrium existing between the supply wind pressure acting on the valve flap 58 and on the diphragm 64 will be disturbed whereby the diaphragm 64 and the valve flap 58 are lifted. As soon as the valve 58 opens, compressed air enters the chamber 55 from the channel 54' and raises the pressure in chamber 55 to $p_2$, $p_2$ being the requisite pressure for operating the tone-producers. $p_2$ of course tends to close valve 58 and the degree of $p_2$ follows from a consideration of the conditions of equilibrium of the floating valve. These conditions may be expressed by the following equation:

$$+p-p+p_1-p_2=0,$$

it being assumed that the effective surfaces of the valve flap 58 and of the diaphragm 64 are substantially equal. The equation proves that $p_2$ equals $p_1$, that is to say, the pressure in the operating chamber $p_2$ is always substantially equal to the pressure $p_1$ prevailing in the control chamber. Consequently, the operating pressure $p_2$ also depends on the ratio $$\frac{A}{E}$$

As above mentioned, it is an object of the invention to provide means for arbitrarily determining or regulating the rate at which the operating pressure increases to its full value upon the key actuation and the rate at which it decreases upon the release of the key. For this purpose I have provided means permitting to effect such a control for each tone-producer separately and to thus satisfy the individual requirements of the different instruments. These means comprise mechanism for varying the cross-sections of the inlets and outlets of the control chambers. Such mechanism may be in form of exchangeable throttling elements but is preferably formed by adjustable throttle valve such as indicated in Fig. 9 at 14, 15, 16, 80, 81 and 82.

The operating pressure in the base of the different instruments such as pipes, varies considerably. The pressure in the wind way must be sufficiently high, of course, to produce the maximum base pressure which may be required. When pipes or other instruments requiring a low base pressure are to be supplied from the same source, throttling means must be provided and, prior to my invention, it was customary for this purpose to give the inlet of the base a very small cross-section. This involves the disadvantage that a sharp thin jet of wind enters the base which is liable to produce turbulent air currents adversely affecting the response and the sound of the instrument. The response may be improved by providing a large entrance port at the foot, but this requires that the difference in pressure between the base and the operating chamber be comparatively small. Prior to my invention it was customary, for this purpose, to insert regulating bellows between the source of pressure and the wind chest for reducing the pressure to the required degree. It will be readily appreciated that the necessity of providing a large number of such regulating bellows increases considerably the cost of manufacture, quite apart from the fact that the bellows require considerable space.

It is an object of my invention to do away with these regulating bellows altogether, and I attain this object by the improved valve system which permits arbitrarily determining the wind pressure in the control chamber by a simple adjustment, irrespective of the wind pressure and of the cross-section of the foot port of the pipe. Another advantage offered by my invention is the possibility of easily regulating the sound volume of the tone-producers independently, as above explained. This facilitates the tuning operation considerably. Prior to my invention this tuning operation required a change of the base inlet ports of the pipes and normally this change required a disassembly of the pipe. With my invention the foot port of the pipe may be made as large as desired from the beginning and it will not be necessary to disassemble the pipe for regulating its sound volume, as the control wind pressure needs only to be varied by suitable adjustment of the throttling means controlling the inlet and/or outlet of the control chamber.

The arrangement and function of my improved valve system will be easily understood from a description of Fig. 1. The wind pressure $p$ prevailing in the wind way 1 of the wind chest acts on a diaphragm 2 which is attached to a ring 3 inserted in a casing 4 which is mounted and suitably sealed within an opening provided in the bottom wall 5 of the wind way. The air pressure $p$ in the space 1 acts also on a valve plate 8 which is connected with the diaphragm 2 by a pull member 7. The valve plate 8 is adapted to seal the upper end of a tube 10 inserted and sealed within a suitable opening in the top wall 9 of the chest.

The diaphragm 2 and the valve plate 8 are so dimensioned that the total pressure acting on the diaphragm is a little larger than that acting on the valve plate, whereby the valve is normally kept in closed position in which it interrupts the communication of the space 1 with the operating chamber 11 of the tone-producer 12. A control chamber 13 is provided within the casing 4 below the diaphragm 2 and has an inlet port communicating with an admission conduit 14 and an outlet port communicating with a discharge conduit 15. A cock 16 is inserted in the admission conduit 14, and, similarly, the discharge conduit 15 may be more or less throttled by a cock 17. The admission conduit 14 communicates by pipe 18 with a suitable pneumatic or electro-pneumatic relays (not shown) which is operative upon depression of an associated key to supply conduit 14 with wind of the pressure $p_r$. This wind enters the control chamber below the diaphragm and partly relieves the latter from the closing pressure exerted by $p$, depending on the degree of $p_r$. This has the effect that the pressure $p$ tending to open the valve plate will become larger than the difference in the pressures $p$ and $p_r$ acting on the diaphragm and tending to close the valve. Therefore, the valve plate 8 will be opened permitting wind from space 1 to enter the operating chamber 11 in which the pressure will be raised to $p_2$. The wind with the pressure $p_2$ operates the tone-producer 12, but at the same time tends to close the valve plate 8 keeping the latter in floating condition in which the forces acting on the members 2 and 8 balance each other.

As above explained, there exists a definite proportion between the pressure $p_1$ prevailing in the control chamber 13 and the pressure $p_2$ prevailing in the operating chamber 11, these two pressures being substantially alike if the surfaces of the floating valve and of the diaphragm are alike.

With my improved control system I may so regulate the pressure $p_1$ in the control chamber 13 regardless of the degree of the supply pressure $p_r$ that the operating wind pressure $p_2$ in the chamber 11 will have the degree required in the particular case for a proper operation of the tone-producer 12. Assuming that the supply pressure $p_r$ be constant, it follows from the above explanations of the conditions prevailing that the control pressure $p_1$ in chamber 13 depends on the ratio of the areas of the inlet and outlet port, $$p_1 = p_r \cdot \frac{1}{1-\left(\dfrac{A}{E}\right)^2}$$

the cross-section A of the outlet port being adjustable by cock 17 and the cross-section E of the inlet port being adjustable by cock 16.

With cock 16 being closed, that is to say, with $E=0$, it will be understood that $p_1=0$; with cock 16 being opened and cock 17 being closed, that is to say, $A=0$ however, it will be $p_1=p_r$. By suitably adjusting the cocks 16 and 17, the pressure $p_1$ prevailing in the controlling chamber 13 may be given any desired degree varying from 0 to $p_r$. Accordingly, the pressure $p_2$ may be arbitrarily varied from 0 to a maximum degree.

The maximum degree is obtained if $p_1=p_r$, but it will be understood that this maximum degree depends not only on $p_r$ but also on $p$ and on the ratio of the effective surfaces of the diaphragm and the valve member. Ordinarily, the maximum amount of $p_2$ will be smaller than $p_r$ or $p$, but this is of little importance if the pressure $p_2$ may be increased by raising the pressure $p_1$ within the possible limits to the maximum degree required for operating the different tone-producers mounted on the wind chest.

While the degree of the blowing pressure of the organ-pipe determines the proper volume and character of the sound, the rate at which this pressure rises upon key-depression from zero to its full amount or the rate at which the pressure drops to zero upon the release of the key is of controlling importance for a proper response of the pipe and for a proper decay of its sound. If the pressure rises too fast, turbulent air-currents will be formed within the labium and will interfere with the proper formation of the stationary acoustic wave within the pipe and will produce a retarded improper response coupled with blowing sounds and upper harmonics, with too rapid a pressure drop, however, the decay of the sound is too sudden and abrupt. Too slow a pressure increase and too slow a pressure drop, however, result in the well-known drawling of the tone which is due to the dependency of the tone of pipes on the operating pressure. A clear and smooth and yet faster response than obtainable with an unduly increased wind-pressure and a smooth decay is obtainable for each kind of pipe only by suitably regulating, within narrow limits, the speed of increase and decrease of the operating pressure, the pressure being sufficiently low to avoid turbulent currents and yet high enough to obtain a tone which is no longer perceived by the auditor as a drawling tone, but appears to him to be of agreeable softness.

My improved means for adjusting the operating pressure are also adapted to control the rate of decrease and increase of the blowing pressure. It will be appreciated that the rate of increase and decrease of the pressures $p_1$ and thus of the pressure $p_2$ may be varied by faster or slower charging or discharging the control chamber 13. This effect may be attained by increasing or decreasing the cross-section of the cocks 16 and 17. The peculiar fact that the above described control of pressure degree does not depend on the absolute amount of the port cross-sections but on the ratio of the same only, permits with any given adjustment of the cock 16, to make the throttling cross-section of the cock 17 so small in any case as required for obtaining the desired ratio resulting in the pressure $p_1$. Hence, it is aways possible to adjust the cocks 16 and 17 so as to determine not only the desired degree of pressure $p_2$, but also the desired rate of increase and decrease of this pressure, provided the cock-cross-sections be made sufficiently small. As the cock 17 is normally always more or less open, part of the air entering through cock 16 will be immediately discharged through cock 17. With the cock 17 being open, it takes a longer period of time for attaining the final condition than with the cock being closed. For attaining a desired filling period, the cross-section of the cock 16 may be made relatively large so that it is less liable to get clogged by entering dust particles than if the cock 17 were closed or were absent altogether, in which event $p_r$ would equal $p_1$, of course. Obviously, the rate of increase and decrease of the pressure may be arbitrarily determined with a given adjustment of the cocks by suitably dimensioning the volume of chamber 13, an increase of volume resulting in a reduction of said rate. This is illustrated in Fig. 9 where I have shown three different tone producers associated with control chambers 61, 62 and 63 of different volumes, chosen in dependence of the various characteristics of the tone producers.

Experience has shown, however, that in favor of a small air consumption this chamber may be made very small, provided the cock throttle cross-sections are well adjustable in their lower range. To this end, I prefer to employ cocks having ports of triangular cross-section as indicated in Fig. 2. With such a cock, a very small cross-section only is opened by the initial opening adjustment of the valve, this cross-section being formed by the cooperation of a corner of the triangle with the circular ports 14 and 15.

Figure 3:
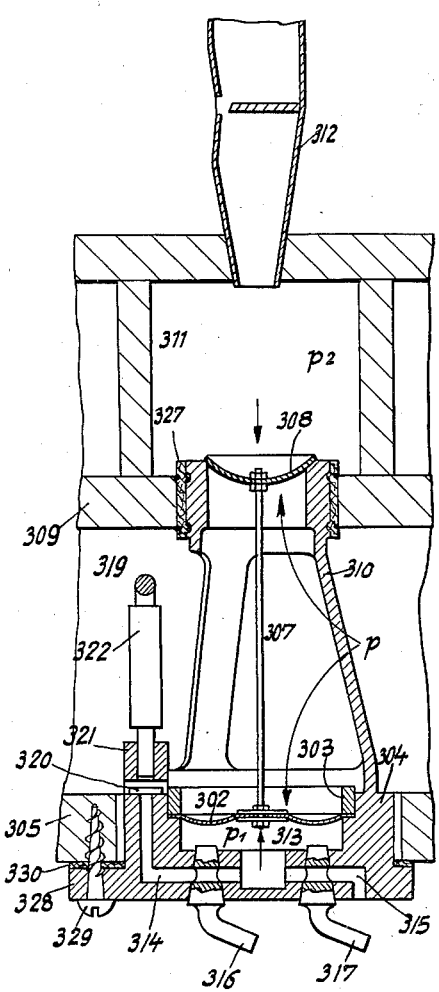
Fig. 3 is an axial section of a modified valve mounted in an undivided chest ("kanzellenlosen Lade") having separate blowing or operating chambers.
Figure 4:
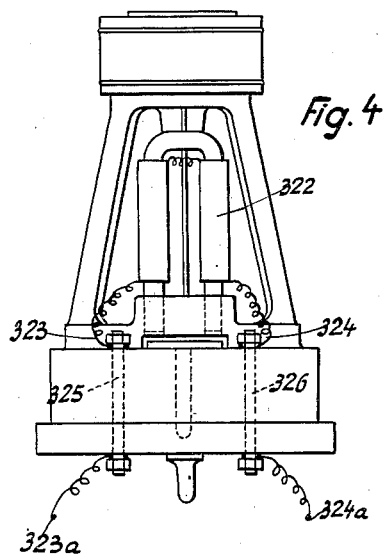
Fig. 4 is an elevation of the valve-unit viewed from the left of Fig. 3.

The embodiment of my invention illustrated in Figs. 3 and 4 differs from that shown in Fig. 1 primarily by the provision of an electromagnetic controlling member individually coordinated to this particular valve. Moreover, the operating wind is directly supplied from the chamber 319 which, in this particular case, is not a division stop chamber, but is a wind-chest which is common to all tone producers mounted on the chest and serves also to supply the blowing wind to the tone producers.

The diaphragm casing 304 is integral with a basket 310 carrying the valve-seat member. The whole valve structure constitutes a unit which may be easily inserted and removed from the chest and may be assembled separately per se. Moreover, the rigid connection of the valve seat and the diaphragm casing offers the advantage that the distance of the diaphragm 302 from the valve seat 308 will not be affected by relative displacement of the bottom plate 305 and the cover plate 309 which are made of wood and, therefore, are liable to shrink or warp. To permit of such relative displacement, the head portion forming the valve seat is made cylindrical and is surrounded by a resilient layer 327 which compensates for a change of the shape of the opening accommodating the head portion of the casing.

The conduit 314 which supplies the control-chamber with the wind does not lead to a separate source of compressed air as in Fig. 1, but leads to the compartment 319. Normally, the mouth of the conduit 314 is kept closed by a plate 320 of magnetic material, for instance of steel, which is guided by suitable means (not shown) to be movable in vertical direction only. A bracket 321 which is preferably integral with the diaphragm casing 304 supports an electromagnet 322 arranged above the plate 320 and operative, when energized, to lift this plate. The coil of the electro-magnet may be energized through wires 323 and 324 (Fig. 4) leading to terminal screws 325 and 326. The terminals are connected with leads 323a and 324a which are connected with the key-contacts through the intermediary of the customary register mechanism. When the electromagnet 322 is energized, it will lift the armature plate 320 and will thus open the conduit 314, whereby control-wind is admitted from the wind-way 319 to the control-chamber 313. This causes the valve plate 308 connected with the diaphragm 302 by rod 307 to be lifted, whereby wind is admitted from the compartment 319 through the openings of the basket 310 to the operating chamber 311 which is individually coordinated to the tone producer 312. The pressure of the operating wind depends on the adjustment of cocks 316 and 317, the cock 316 controlling the admission conduit 314 and the cock 317 controlling a discharge conduit 315.

The casing 304 is formed with a flange 328 which is detachably secured in place on the botton plate 305 of the chest by means of screws, 329, a resilient washer 330 being interposed to secure a leak-proof connection. The diaphragm 302 is held in place in the casing 304 by a clamping ring 303 secured to the casing by suitable means not shown.

It will be noted that the valve unit illustrated in Figs. 3 and 4 is designed for insertion in the chest, and for adjustment, from below. Therefore, it is applicable to such chests only which are accessible from below.

In Figs. 5 to 8, I have illustrated a modified valve-structure which may be inserted in the top of the chest and may be adjusted from above. This type of valve, therefore, may be used in case the chest is not accessible from below.

The valve unit comprises a diaphragm casing 504 which is formed with a flange 531 bearing on the top 532 of the chest, a washer 534 being suitably interposed to secure a tight seal. The diaphragm casing 504 accommodates the valve seat member 510 formed with a flange 535 bearing against the diaphragm casing flange 531, a washer 536 being interposed. The valve seat member 510 extends downwardly towards the bottom of the diaphragm casing 504 and bears against the margin of the diaphragm 502, thus securing and clamping the same in position. The required clamping pressure is exerted by bolts 537 (Fig. 6 and 7) which extend through the flange 535, through the wall of casing 504 and through a bottom-plate 538 so as to secure the various elements of the unit to each other.

The walls of the casing 504 and of the lower portion of the valve seat member are provided with large openings 539 to permit the wind in the chest to freely enter the space between the diaphragm 502 and the valve plate 508. An electromagnet 522 of the shape shown in Fig. 6 is inserted through one of these openings, the free ends of the core of the electromagnet being inserted in borings provided in the wall of the casing 504 at a level just above the upper mouth of a channel 514.

The mouth of this channel is normally closed by an armature plate 520 of magnetic material which is formed with a vertical pin 541 guided in an axial boring of a bolt 540 which is screwed from above into a tapped vertical boring provided in the wall of the casing 504 and passing between the two borings accommodating the armature core. Wires 523 and 524 lead from the coil of the electromagnet to terminal screws 525 and 526 which are inserted in, and suitably insulated from, the wall of the diaphragm casing 504. The terminal ends of the screws 525 and 526 are connected to leads 523a and 524a leading to the keyboard. The electromagnetic actuation of the valve plate 520 permits adjustment of the stroke of the valve and this adjustment may be effected by turning the screw 540 by aid of a handle 542 or similar means, such as a screw driver or a wrench. The stroke of the plate 520 is limited by the spacing of its upper face from the lower end of screw 540 and the length of this stroke determines the throttling cross-section of the conduit 514 which admits the control wind below the diaphragm.

It will be understood that this throttling cross-section may be varied by lowering or lifting the adjusting screw 540 and, therefore, this screw performs a similar function, as the cock 316 in the embodiment shown in Figs. 3 and 4. The conduit 514 provided for within the wall of the casing 504 communicates with a groove 543 in the plate 538, and this groove establishes the connection of the conduit 514 with the control chamber 513 below the diaphragm. A similar groove 544 connects the control-chamber with a vertical discharge channel 515 in the wall of the diaphragm casing 504, the effective cross-section of the discharge conduit being adjustable by a cock 545, compare Fig. 8. The cock member has an axial boring 546 which communicates with the discharge conduit 514 and is provided with a lateral triangular port 547 which, by turning the cock, may be brought to registry with the mouth of an exhaust channel 548 provided for in the upper portion of casing 504.

A conical block 549 inserted in the valve seat member 516 confines with the latter the operating chamber 511 and forms the support of the tone producer 512.

Although the three embodiments of my improved valve structure hereinbefore described are adapted for different purposes and, therefore, differ from each other in construction, it will be appreciated that it is a characteristic of all of the different designs that the controlling chamber of a floating valve of the type disclosed in my U. S. Patent No. 1,681,547 is provided with two independent ports for the admission and for the discharge of the controlling wind, means being provided to control the effective cross-section of these ports, whereby the pressure of the blowing wind and the rate of increase and decrease of this pressure may be independently adjusted so as to satisfy the requirements in each particular case.

My invention is capable of numerous modifications within the scope of the appended claims. Under certain circumstances, it may suffice to adjust one of the two ports only, and the means for adjustment may comprise means other than cocks or the like.

What I claim is:

1. Controlling system of the character described comprising a plurality of pneumatically operable instruments of different characteristics, floating valves individually associated with and arranged to open towards said instruments to control the operation of the same, a separate control chamber for each floating valve, and means responsive to the pneumatic pressure in each control chamber and connected with the associated floating valve whereby the amount of said pressure will determine the lift of and the throttling effect exerted by said floating valve, each control chamber being provided with an admission port and with a discharge port, the various ports being differentially proportioned and dimensioned in dependence of said characteristics.

2. Controlling system of the character described comprising a plurality of pneumatically operable instruments of different characteristics, floating valves individually associated with and arranged to open towards said instruments to control the operation of the same, a separate control chamber for each floating valve, and means responsive to the pneumatic pressure in each control chamber and connected with the associated floating valve whereby the amount of said pressure will determine the lift of and the throttling effect exerted by said floating valve, each control chamber being provided with an admission port and with a discharge port, and means for adjusting at least certain of said ports in dependence of said characteristics.

3. In a controlling system of the character described, the combination of a pneumatically operable instrument with a control valve, a pneumatic relay including a diaphragm control chamber for governing said valve, a source of pressure, key-controlled mechanism for connecting said source with said chamber, and adjustable means adapted to variably determine the maximum pneumatic pressure in said chamber and the rate at which said pressure changes in response to the key operation of said mechanism.

4. Controlling system of the character described comprising a plurality of pneumatically operable instruments of different characteristics, floating valves individually associated with and arranged to open towards said instruments to control the operation of the same, a separate control chamber for each floating valve, and means responsive to the pneumatic pressure in each control chamber and connected with the associated floating valve whereby the amount of said pressure will determine the lift of and the throttling effect exerted by said floating valve, each control chamber being provided with an admission port and with a discharge port, and cocks for adjusting at least certain of said ports in dependence of said characteristics.

5. The combination comprising a pneumatically operable instrument, a floating valve controlling the same, a penumatic relay governing said valve and including a diaphragm chamber, said chamber being provided with an admission port and a discharge port and a cock for adjusting at least one of said ports, said cock being provided with a triangular passage, a corner of said passage cooperating with said port whereby the same may be gradually opened and minutely adjusted.

6. The combination comprising a pneumatically operable instrument, a floating valve arranged to open towards and control the same, a pneumatic relay governing said valve and including a diaphragm chamber, whereby the amount of pressure in said chamber will determine the lift of and the throttling effect exerted by said floating valve, said chamber being provided with an admission port and a discharge port, an armature plate normally closing said admission port, a key-controlled electro-magnet adapted to lift said plate, whereby said admission port will be opened, and an adjustable stop for limiting the stroke of said valve.

7. In an organ the combination with a pipe of a controlling unit comprising a floating valve arranged to open towards said pipe and a diaphragm connected to said valve, both being mounted within a casing removably inserted in the wind chest of the organ, a control chamber confined in said casing by said diaphragm whereby the amount of pressure in said chamber will determine the lift of and the throttling effect exerted by said floating valve, said chamber being provided with an admission port and a discharge port and members mounted in said casing for adjusting the cross-section of said ports.

8. The combination comprising a pneumatically operable instrument, a floating valve arranged to open towards and to control the same, a pneumatic relay governing said valve and including a diaphragm chamber, whereby the amount of pressure in said chamber will determine the lift of and the throttling effect exerted by said floating valve, said chamber being provided with an admission port and a discharge port, an armature plate normally closing said admission port, a key-controlled electro-magnet adapted to lift said plate, whereby said admission port will be opened.

MAX MAAG.